(12) United States Patent
Wickens

(10) Patent No.: US 6,685,359 B2
(45) Date of Patent: Feb. 3, 2004

(54) METHOD AND APPARATUS FOR PRELOADING THE OUTER RACE OF A TAPERED ROLLER BEARING IN A VEHICLE AXLE DIFFERENTIAL

(76) Inventor: Jeffrey S. Wickens, 12070 Farmington Rd., Livonia, MI (US) 48150

( * ) Notice: Subject to any disclaimer, the term of this patent is extended or adjusted under 35 U.S.C. 154(b) by 0 days.

(21) Appl. No.: 10/072,205

(22) Filed: Feb. 11, 2002

(65) Prior Publication Data

US 2003/0152303 A1 Aug. 14, 2003

(51) Int. Cl.[7] .............................................. F16C 23/10
(52) U.S. Cl. ....................... 384/563; 29/898.09; 384/383
(58) Field of Search ................................ 384/571, 563, 384/583, 517, 519, 540, 551, 562; 29/898.09, 724

(56) References Cited

U.S. PATENT DOCUMENTS

| | | | | |
|---|---|---|---|---|
| 1,683,593 A | * | 9/1928 | Chievitz | 384/583 |
| 1,683,594 A | * | 9/1928 | Chievitz | 384/583 |
| 2,147,787 A | * | 2/1939 | Ferguson | 384/540 |
| 3,069,928 A | * | 12/1962 | Cote et al. | 475/246 |
| 3,770,994 A | * | 11/1973 | Smith | 384/583 |
| 4,657,412 A | * | 4/1987 | McLarty et al. | 384/447 |
| 5,269,731 A | * | 12/1993 | Scudder et al. | 475/230 |
| 5,535,517 A | | 7/1996 | Rode | 29/898.09 |
| 5,624,345 A | | 4/1997 | Graft et al. | 475/230 |
| 6,062,737 A | | 5/2000 | Thienes | 384/589 |
| 6,227,716 B1 | * | 5/2001 | Irwin | 384/583 |
| 6,409,626 B1 | * | 6/2002 | Irwin | 475/230 |

\* cited by examiner

*Primary Examiner*—Thomas R. Hannon
(74) *Attorney, Agent, or Firm*—Charles W. Chandler

(57) ABSTRACT

A pair of threadably engaged sleeves are supported around a shaft, and engage the outer races of a pair of shaft mounted tapered roller bearings to apply a tensile preload on the outer races.

8 Claims, 2 Drawing Sheets

METHOD AND APPARATUS FOR PRELOADING THE OUTER RACE OF A TAPERED ROLLER BEARING IN A VEHICLE AXLE DIFFERENTIAL

BACKGROUND AND SUMMARY OF THE INVENTION

This invention relates in general to automotive differentials, including a differential carrier rotatably supporting a differential case bearing assembly mounted in the carrier. Typically, a conventional differential has a pinion shaft supported by a pair of axially spaced tapered roller bearings. A second pair of tapered roller bearings support the differential case. It is common practice to preload the inner races of each pair of tapered roller bearings by an axial compressive force.

Preloading the inner races of tapered roller bearings, is illustrated in U.S. Pat. No. 6,062,737 issued May 16, 2000, to James E. Thienes for "Wheel Hub Retention Apparatus", by threading a compression member on the shaft against the inner race of one of the bearings.

Another arrangement is illustrated in U.S. Pat. No. 5,535,517 issued Jul. 16, 1996, to John E. Rode for "Bearing Setting Procedure and Apparatus", for preloading tapered roller bearings using a collapsible spacer between the inner races of the two bearings.

U.S. Pat. No. 5,624,345 issued Apr. 29, 1997, to John T. Graft and Richard E. Cleveland, for "Apparatus for Preloading Axle Differential Bearings and Method of Assembling a Differential", discloses a load deflection member acting on the bearing assembly to maintain a constant predetermined bearing preload to accommodate wear of the drive gears and the bearing assembly.

The broad purpose of the present invention is to provide a means for adjustably preloading the outer races of a pair of axially spaced tapered roller bearings by providing a pair of threadably connected sleeves. The outer races of both bearings are preloaded by rotating one of the sleeves. The method permits precise preloading of the bearings to accommodate the manufacturing tolerances of the particular axle, the gear arrangement and the geometry of the differential bearings.

The new design simplifies carrier manufacture by allowing a single tool pass to form all necessary bore surfaces for each of the pinion and differential bores. This should significantly reduce machining costs and improve quality.

The new design allows the pinion to be pre-assembled without selectable spacer shims or collapsible spacers, further reducing the cost of manufacturing.

The pinion bearing preload drag can be verified prior to installation with the carrier.

The cartridge assemblies can be made of a material that is suitable to support the loading stresses generated by the threaded features, while the carrier is made from a relatively light or soft material, i.e. aluminum, plastic, composite or similar.

The new differential bearing cartridge design eliminates the need for bearing caps that are required in traditional designs.

Still further objects and advantages of the invention will become readily apparent to those skilled in the art to which the invention pertains upon reference to the following detailed description.

DESCRIPTION OF THE DRAWINGS

The description refers to the accompanying drawings in which like reference characters refer to like parts throughout the several views, and in which.

DESCRIPTION OF THE PREFERRED EMBODIMENT

Figure 1:
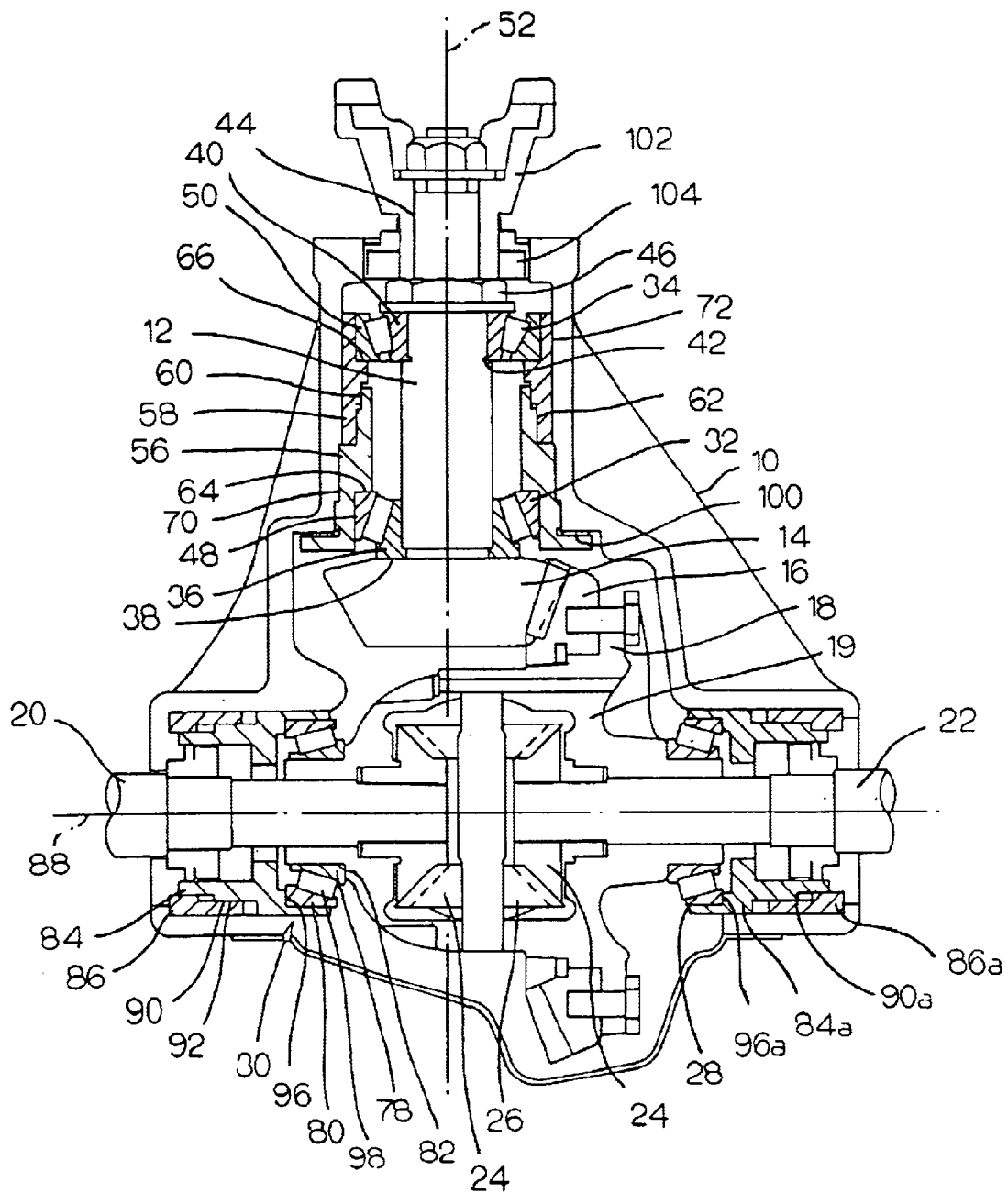
FIG. 1 is a cross-sectional view of a vehicle differential illustrating the invention.
Figure 2:
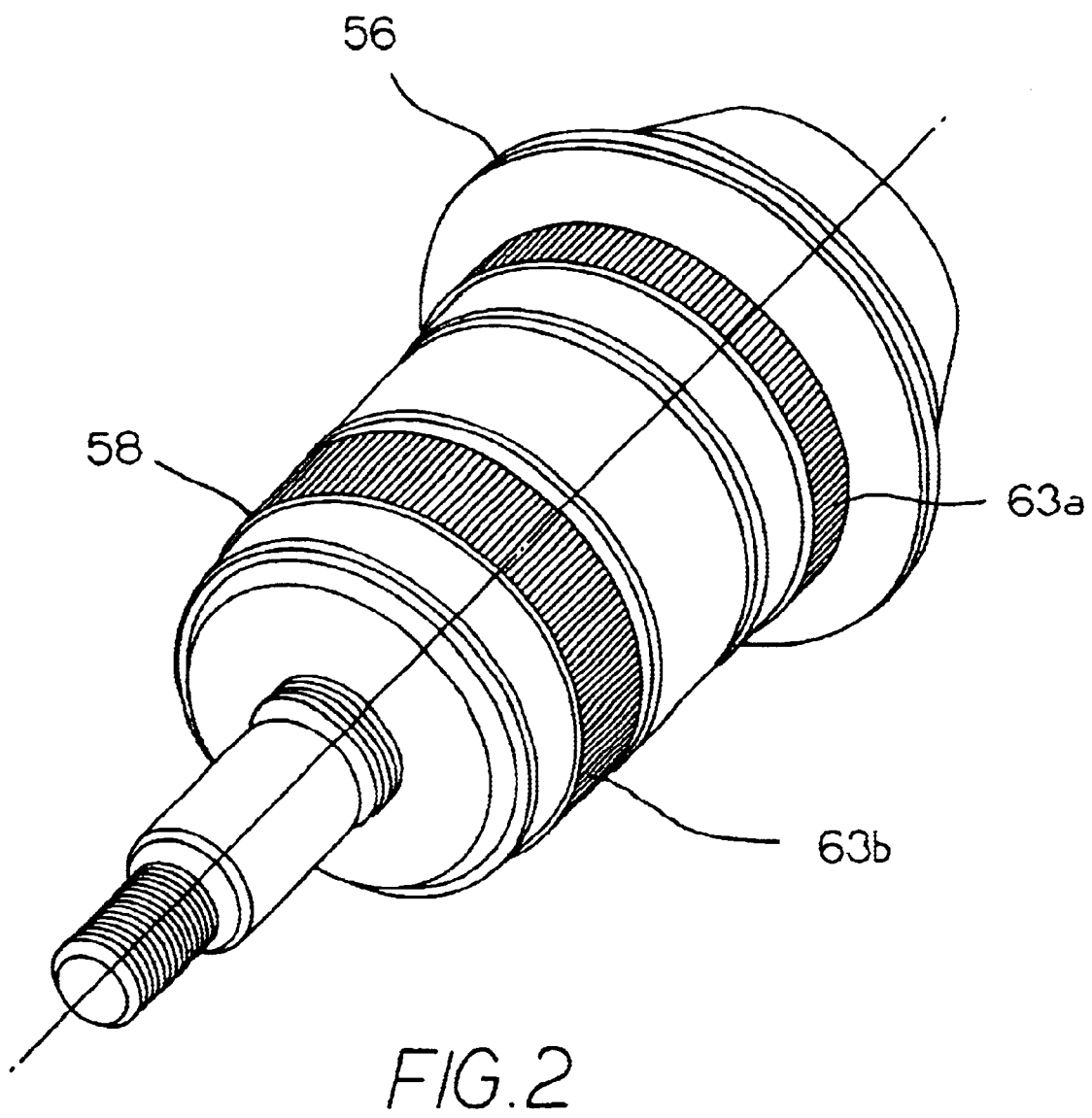
FIG. 2 is a view of a pair of sleeves preloading a pair of enclosed tapered roller bearings on the pinion shaft of the differential.

Referring to the drawings, FIG. 1, illustrates a vehicle differential which includes a differential housing (carrier) 10, on the underside of a vehicle (not shown). The differential includes a pinion shaft 12 upon which a power input pinion gear 14 is typically formed. Pinion gear 14 meshes with a ring gear 16 which in turn is secured to a ring gear flange 18 associated with a differential rotor or case 19. Differential case 19 along with ring gear 16 are rotated in the stationary housing 10 by means of pinion gear 14. The rotary motion of the differential case is imparted to drive axles 20 and 22 and wheels (not shown) of the vehicle. Each of the drive axles is coupled to an output beveled gear set 24 permitting the two axles to be driven at different speeds.

A plurality of planetary gears 26 mesh with the output gear set 24 to transfer power. Drive axles 20 and 22 are rotatably supported in the housing by means of a pair of tapered roller bearing assemblies generally indicated at 28 and 30.

Pinion shaft 12 is supported by a pair of axially spaced tapered roller bearings generally indicated at 32 and 34. Roller bearing 32 includes an inner race 36 seated against a shoulder 38 carried on the pinion shaft. Roller bearing 34 has an inner race 40 seated against an annular shoulder 42 on the pinion shaft.

The outer end of the shaft is threaded at 44. A nut 46, carried on the threaded end 44 of the shaft, engages inner race 40 to secure it against axial motion with respect to the pinion shaft.

Roller bearing 32 has an outer race 48. Roller bearing 34 has an outer race 50. Both bearings 32 and 34 permit the pinion shaft to rotate about an axis 52.

A pair of adjustment sleeves 56 and 58 are mounted on outer races 48 and 50, respectively. Sleeve 56 has a threaded section 60 disposed around the axis of the shaft. Sleeve 58 has a threaded section 62 threadably engaged with threaded section 60. The two sleeves are axially movable with respect to one another by rotating one of the sleeves with respect to the other.

Serrated external structure sleeves 63a and 63b on 56 and 58 prevent rotation of the sleeves upon installation into the carrier 10.

Sleeve 56 has a shoulder 64 engaging the inner face of outer race 48. Sleeve 58 has an annular shoulder 66 engaging the inner face of outer race 50. Sleeve 56 is slidably mounted in a cylindrical surface 70 of the housing, while sleeve 58 is slidably disposed in a cylindrical surface 72 of the housing. The arrangement is such that by threadably rotating one of the sleeves with respect to the other, the two sleeves apply an adjustable tensile preload against outer races 48 and 50 of the two bearings.

Still referring to FIG. 1, tapered roller bearing 30 includes an inner race 78 and an outer race 80. The inner race is seated against a shoulder 82 of case 19. A pair of adjustable sleeves 84 and 86 are mounted in the housing. Sleeve 86 is fixed against axial motion, about the axis of rotation 88 of drive axle 20, and has threaded means 90 threadably engaging complementary threads 92 of sleeve 84. Sleeve 84 engages the outer face 96 of outer race 80, that is, the face adjacent the narrow end of roller means 98. Serrations on sleeves 86 and 86a prevent rotation of the housings upon installation into carrier 10. The arrangement is such that by rotating sleeve 84, a desired axial preload is applied to outer race 80. Sleeves 84 and 84a are mechanically locked to prevent rotation once differential bearing preload and ring gear lash has been established.

Tapered roller bearing 28, mounted on drive axle 22, is preloaded in a similar fashion by parts designated with an "a" that are similar to the corresponding components used for preloading roller bearing assembly 30.

After the pinion cartridge is assembled to the carrier, nut 46 allows the pinion drag to be monitored without a yoke 102 or companion flange (not shown) in place thereby removing the influence of seal 104 drag.

Proper pinion gear position is set using a single spacer 100. The external configuration of this spacer allows it to be changed without disturbing the pinion bearing preload.

Sleeves 56, 58, 84 and 84a physically support and contain the bearing races 48, 50 and 80 and 80a to insure movement when threadably adjusted. Bearing races 48, 50 and 80 and 80a are typically press fit to carrier 10 to prevent rotation of the race during operation. This interference prevents the proper setting of the bearing position with conventional adjuster nut assemblies.

Pinion seal 104 is installed after the assembly of the pinion cartridge to reduce the likelihood of damage to the seal.

Separated cartridge assemblies generated by the assembly of sleeves 56, 58 and 84, 86 and 84a, 86a allow the use of dissimilar materials between the cartridges and the carrier without the loss of bearing retention caused by thermal growth differences between the materials.

By adjusting sleeves 84 and 84a separately or in tandem, the proper lash may be set between the ring gear 16 and the pinion gear 14.

Having described my invention, I claim:

1. A method for preloading a pair of axially spaced first and second tapered roller bearings, each having an inner race mounted along a shaft having a rotating axis, comprising the steps of:

providing structure engaging the inner race of a first tapered roller bearing and the inner race of a second tapered roller bearing to limit axial motion of the inner race of the first roller bearing, either toward or away from the inner race of the second roller bearing;

engaging the outer race of the first tapered roller bearing with a first adjustment member (56), such that the outer race of the first bearing is axially movable with respect to said structure;

engaging the outer race of the second roller bearing with a second adjustment member (58), such that the outer race of the second bearing is axially movable with respect to said structure;

threadably engaging the first adjustment with the second adjustment member; and preloading the outer races of the first tapered roller bearing and the second tapered roller bearing by rotating the first adjustment member with respect to the second adjustment member about the axis of rotation of the shaft prior to installation in a differential housing.

2. A method as defined in claim 1, including the step of threadably rotating the second adjustment member away from the first adjustment member to apply a tensile load between the outer races of the first tapered roller bearing and the second tapered roller bearing.

3. A combination comprising:

a shaft having an axis of rotation;

a housing having an opening for slidably receiving a portion of the shaft;

a first tapered roller bearing having an inner race and an outer race, the inner race thereof being mounted on the shaft so as to be rotatable therewith, the outer race thereof being mounted in the housing so as to be axially movable thereto against rotation;

a second tapered roller bearing having an inner race and an outer race, the inner race thereof being mounted on the shaft so as to be rotatable therewith, the outer race thereof being mounted in the housing so as to be thereto against rotation;

structure mounted on the shaft and supporting the inner race of the first tapered roller bearing and the inner race of the second tapered roller bearing to limit axial motion thereof, but permitting axial movement of the outer race of the first roller bearing with respect to the inner race thereof;

a first adjustment sleeve mounted around the shaft and axially movable thereto, and engaging the outer race of the first tapered roller bearing, the first adjustment sleeve having threaded means disposed about said shaft axis of rotation;

a second adjustment sleeve mounted around the shaft and axially movable thereto and engaging the outer race of the second tapered roller bearing, the second adjustment sleeve having threaded means threadably engaging the threaded means of the first adjustment sleeve such that by rotating one of the sleeves about the shaft axis prior to installation in the opening in said housing, the two sleeves cooperate in axially urging the outer races of the first and the second tapered roller bearings in opposite axial directions; and both of said sleeves, when interengaged, being slidably receivable in the opening in the housing.

4. A vehicle axle differential, comprising:

a differential housing having a differential case rotatably mounted within said housing, said differential housing supporting axially spaced tapered roller bearing assemblies which rotatably support and position said case within said housing, each of the tapered roller bearing assemblies having an outer race fixed with respect to said housing;

each of said bearing assemblies being mounted in a differential bearing seat formed in said housing; and a pair of threadably engaged sleeve members disposed adjacent said bearing assemblies and engaged with the outer races thereof to adjustably apply an axial tensile force to the outer races thereof, each of said sleeve members being axially movable with respect to said differential shaft prior to being installed in said housing.

5. A vehicle axle differential, comprising:

a differential housing having a shaft rotatably mounted within said housing, said differential housing supporting axially spaced tapered roller bearing assemblies which rotatably support said shaft within said housing;

each of said bearing assemblies being mounted in a differential bearing seat formed in said housing; and a pair of threadably engaged sleeve members disposed adjacent said bearing assemblies and engaged with the outer races thereof to adjustably apply an axial tensile force to the outer races thereof, said sleeve members each being axially movable with respect to said housing.

6. A method for preloading a tapered roller bearing, having an inner race mounted on a shaft having a rotating axis, comprising the steps of:

providing structure engaging the inner race of a tapered roller bearing to prevent axial motion thereof along a shaft on which the inner race is mounted;

engaging the outer race of the tapered roller bearing with a first adjustment sleeve;

threadably engaging the first adjustment sleeve with a second adjustment sleeve;

axially preloading the outer race of the tapered roller bearing by rotating the first adjustment sleeve with respect to the second adjustment sleeve about the axis of rotation of the shaft, and inserting the preloaded tapered roller bearings, the first adjustment sleeve, the second adjustment sleeve and the shaft as a unit into an opening in a housing.

7. A combination comprising:

a shaft having an axis of rotation;

a housing having a portion thereof disposed about a portion of the shaft;

a tapered roller bearing having an inner race and an outer race, the inner race thereof being mounted on the shaft so as to be rotatable therewith, the outer race thereof being mounted in the housing so as to be fixed thereto against rotational motion;

structure mounted on the shaft and supporting the inner race of the tapered roller bearing to prevent axial motion thereof, but permitting axial movement of the outer race of the roller bearing with respect to the inner race thereof;

a first adjustment sleeve mounted around the shaft axis of rotation and engaging the outer race of the tapered roller bearing, the first adjustment sleeve having threaded means disposed about said shaft axis of rotation;

a second adjustment sleeve mounted around the shaft axis of rotation, the second adjustment sleeve having threaded means threadably engaging the threaded means of the first adjustment sleeve such that by rotating one of the sleeves about the shaft axis, the two sleeves cooperate in axially loading the outer race of the tapered roller bearing; and the first adjustment sleeve, the second adjusted sleeve, the tapered roller bearing and the shaft insertable as a unit into said housing.

8. A combination as defined in claim 7, in which the first adjustment sleeve is telescopically and threadably mounted in the second adjustment sleeve.

* * * * *